(12) United States Patent
Nishida

(10) Patent No.: US 10,853,588 B2
(45) Date of Patent: Dec. 1, 2020

(54) ELECTRONIC DEVICE TRANSLATING SECRET WORD USING MASK CHARACTER STRING AND TRANSLATION SUPPORT METHOD

(71) Applicant: KYOCERA Document Solutions Inc., Osaka (JP)

(72) Inventor: Atsushi Nishida, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 105 days.

(21) Appl. No.: 16/139,211

(22) Filed: Sep. 24, 2018

(65) Prior Publication Data
US 2019/0095431 A1   Mar. 28, 2019

(30) Foreign Application Priority Data
Sep. 28, 2017   (JP) ................................. 2017-188424

(51) Int. Cl.
*G06F 40/58* (2020.01)
*G06F 21/62* (2013.01)
(Continued)

(52) U.S. Cl.
CPC .......... *G06F 40/58* (2020.01); *G06F 21/6227* (2013.01); *G06F 40/151* (2020.01); *G06F 40/53* (2020.01); *G06F 21/60* (2013.01)

(58) Field of Classification Search
CPC ..................................................... G06F 17/28
(Continued)

(56) References Cited

U.S. PATENT DOCUMENTS 5,396,419 A * 3/1995 Morimoto ............. G06F 40/268
704/2
5,885,081 A * 3/1999 Tamura ................. G09B 19/06
434/157
(Continued)

FOREIGN PATENT DOCUMENTS

JP   H11-003334 A   1/1999
JP   2006-244029 A   9/2006

OTHER PUBLICATIONS

An Office Action mailed by the Japanese Patent Office dated Jul. 14, 2020, which corresponds to Japanese Patent Application No. 2017-188424 and is related to U.S. Appl. No. 16/139,211; with English language translation.

*Primary Examiner* — Jesse S Pullias
(74) *Attorney, Agent, or Firm* — Studebaker & Brackett PC

(57) ABSTRACT

An electronic device includes a controller and a communication device. The controller acquires data indicating first text in a first language. The controller determines whether or not a secret character string is included in the first text. Upon determining that the secret character string is included in the first text, the controller converts the secret character string into a mask character string. The mask character string is for hiding the secret character string. The controller transmits data indicating first text including the mask character string to a translation server through the communication device. The translation server translates the first text into second text in a second language. When the communication device receives data indicating the second text, the controller searches the second text for a translated mask character string. The controller converts the mask character string in the second language into a secret character string in the second language.

5 Claims, 8 Drawing Sheets

61

| 611 | 612 |
| Secret character string | Secret character string attribute |
| 実用新案株式会社 | 会社 |
| 特許株式会社 | 会社 |
| 特許 太郎 | 人物 |
| ⋮ | ⋮ |

(51) Int. Cl.
  *G06F 40/53*   (2020.01)
  *G06F 40/151*  (2020.01)
  *G06F 21/60*   (2013.01)

(58) Field of Classification Search
  USPC ........................................................ 704/2–8
  See application file for complete search history.

(56) References Cited

U.S. PATENT DOCUMENTS

| | | | |
|---|---|---|---|
| 5,960,080 A * | 9/1999 | Fahlman | G06F 21/6209 |
| | | | 380/252 |
| 7,174,288 B2 * | 2/2007 | Ju | G06F 3/018 |
| | | | 704/2 |
| 7,376,648 B2 * | 5/2008 | Johnson | G06F 16/951 |
| 7,403,888 B1 * | 7/2008 | Wang | G06F 40/289 |
| | | | 704/2 |
| 7,801,720 B2 * | 9/2010 | Satake | G06F 40/58 |
| | | | 704/4 |
| 2004/0044963 A1 * | 3/2004 | Uchiyama | G06F 16/30 |
| | | | 715/229 |
| 2006/0200339 A1 | 9/2006 | Satake et al. | |

* cited by examiner

| Secret character string | Secret character string attribute |
|---|---|
| 実用新案株式会社 | 会社 |
| 特許株式会社 | 会社 |
| 特許 太郎 | 人物 |
| ⋮ | ⋮ |

FIG. 3

| 1st language mask character string | 2nd language mask character string | 2nd language secret character string |
|---|---|---|
| A会社 | Company A | Tokkyo Co., Ltd. |
| 人物A | Person A | Tokkyo Taro |
| B会社 | Company B | Jitsuyoushinan Co., Ltd. |
| ⋮ | ⋮ | ⋮ |

FIG. 6

213   211              212                                21
             ⌐Company A⌐(President:⌐Person A) announced that it acquired
             ⌊Company B, which provides a comprehensive service that
             combines the MDS business and the ICT business that
             optimally arrange printers and multifunction devices in the UK.

FIG. 8A 221              222                                22
          ⌐Tokkyo Co., Ltd.⌐(President:⌐Tokkyo Taro) announced that it
     223  acquired ⌐Jitsuyoshinan Co., Ltd., which provides comprehensive
             services combining MDS business and ICT business that
             optimally arranges printers and multifunction devices in the UK.

FIG. 8B

ELECTRONIC DEVICE TRANSLATING SECRET WORD USING MASK CHARACTER STRING AND TRANSLATION SUPPORT METHOD

INCORPORATION BY REFERENCE

The present application claims priority under 35 U.S.C. § 119 to Japanese Patent Application No. 2017-188424, filed on Sep. 28, 2017. The contents of this application are incorporated herein by reference in their entirety.

BACKGROUND

The present disclosure relates to an electronic device and a translation support method.

A translation device which translates an inputted sentence into a target language has been disclosed. The translation device analyzes the inputted sentence and translates the sentence into the target language based on the analysis result.

SUMMARY

An electronic device according to an aspect of the present disclosure includes a controller, storage, and a communication device. The controller acquires data indicating first text in a first language. The storage stores a secret character string indicating secret information. The communication device performs communication with a translation server which translates the first text into second text in a second language that is different from the first language. The controller determines whether or not the secret character string is included in the first text. Upon determining that the secret character string is included in the first text, the controller converts the secret character string into a mask character string. The mask character string is a character string for hiding the secret character string. The controller transmits data indicating the first text in which the secret character string has been converted into the mask character string to the translation server through the communication device. When the communication device receives data indicating the second text, the controller searches the second text for the mask character string translated into the second language. The controller converts the mask character string in the second language into the secret character string in the second language.

A translation support method according to an aspect of the present disclosure includes the following: determining whether or not a secret character string indicating secret information is included in first text; upon determining that the secret character string is included in the first text, converting the secret character string into a mask character string for hiding the secret character string; transmitting data indicating the first text in which the secret character string has been converted into the mask character string to a translation server; receiving data indicating second text in which the first text has been translated into a second language from the translation server; searching the second text for the mask character string translated into the second language; and converting the mask character string in the second language into the secret character string in the second language.

BRIEF DESCRIPTION OF THE DRAWINGS

FIG. 3 is a diagram illustrating an example of a secret character string table according to the embodiment of the present disclosure.

FIG. 6 is a diagram illustrating an example of a replacement table according to the embodiment of the present disclosure.

FIG. 8A is a diagram illustrating an example of second text before the post-reception conversion process is executed according to the embodiment of the present disclosure.

FIG. 8B is a diagram illustrating an example of second text after the post-reception conversion process has been executed according to the embodiment of the present disclosure.

DETAILED DESCRIPTION

An embodiment of an electronic device and a translation support method according to the present disclosure will be described below with reference to the drawings. Note that elements within the drawings that are the same or equivalent are labelled with the same reference signs and description thereof will not be repeated.

Figure 1:
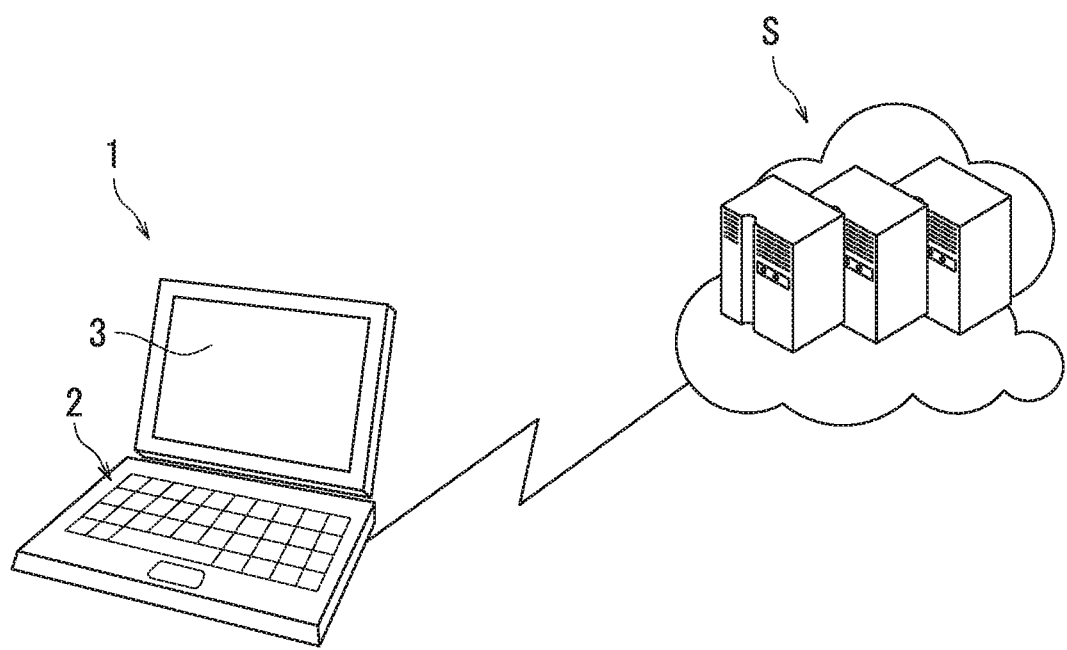
FIG. 1 is a diagram illustrating an electronic device according to an embodiment of the present disclosure.

First, an electronic device 1 according to the embodiment of the present disclosure will be described with reference to FIG. 1. FIG. 1 is a diagram illustrating the electronic device 1 according to the present embodiment.

As illustrated in FIG. 1, the electronic device 1 according to the present embodiment is a personal computer. The electronic device 1 connects to a translation server S through a network such as a wide area network (WAN). The translation server S is provided by a cloud computing service, for example.

The electronic device 1 transmits data indicating first language text to the translation server S. Upon receiving the data indicating the first language text, the translation server S translates the first language text into second language text. The translation server S transmits data indicating the second language text to the electronic device 1. In the following, the first language text will be referred to as "first text" and the second language text will be referred to as "second text". In the present embodiment, the first language is Japanese and the second language is English.

The electronic device 1 includes an input device 2 and an output device 3. In the present embodiment, the input device 2 is a keyboard. The output device 3 is a liquid-crystal display.

The input device 2 receives input of an instruction by a user. The input device 2 also receives input of data by the user. In the present embodiment, the input device 2 receives input of data indicating the first text. The input device 2 also receives input of a translation instruction for the first text.

The user operates the input device 2 to indicate a translation target when inputting the translation instruction.

The output device 3 outputs a processing result of the electronic device 1. In the present embodiment, the output device 3 displays the first text. The output device 3 also displays the second text.

Figure 2:
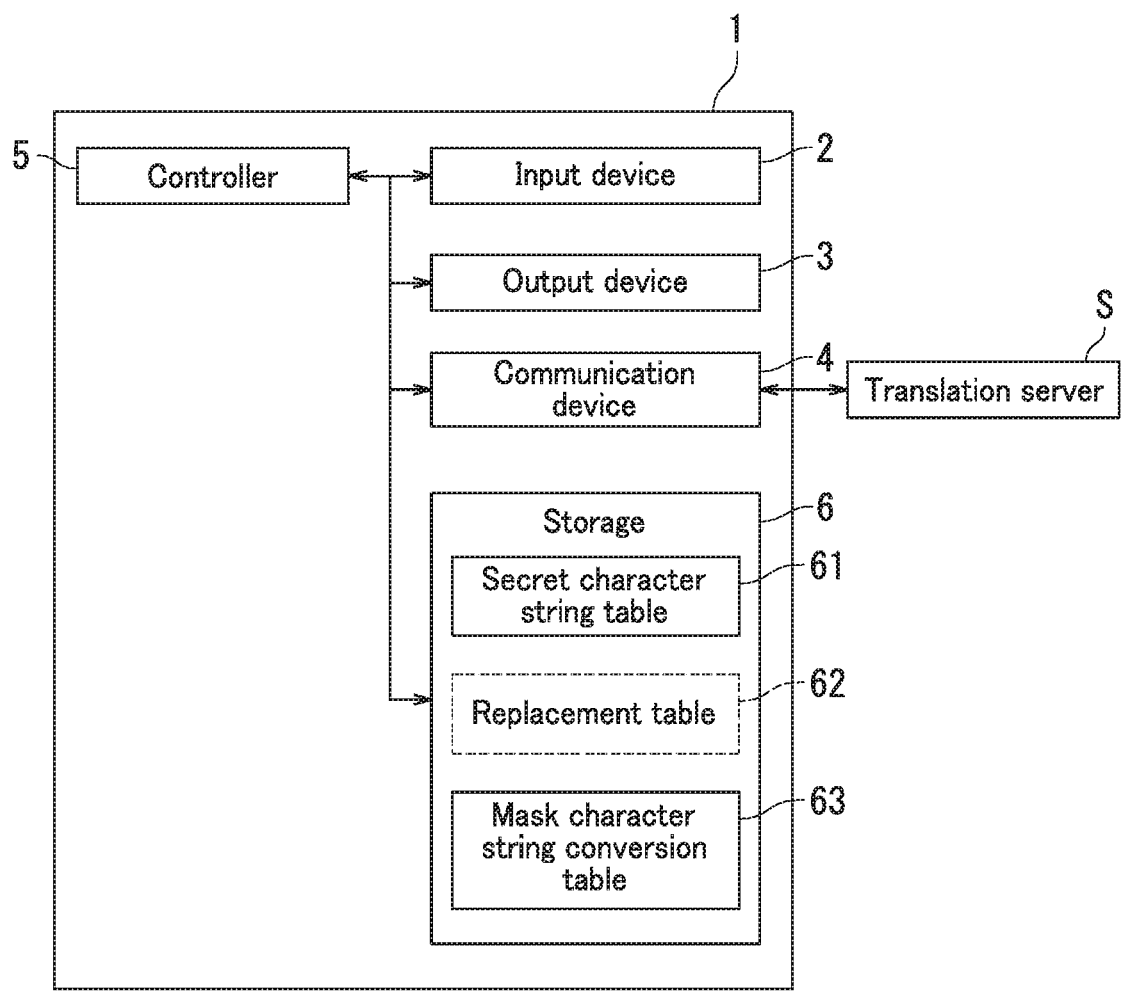
FIG. 2 is a diagram illustrating a configuration of the electronic device according to the embodiment of the present disclosure.

Continuing, a configuration of the electronic device 1 according to the present embodiment will be described with reference to FIG. 2. FIG. 2 is a diagram illustrating the configuration of the electronic device 1 according to the present embodiment.

The electronic device 1 includes a communication device 4, a controller 5, and storage 6 in addition to the input device 2 and the output device 3.

The communication device 4 communicates with the translation server S through the network such as a WAN. In the present embodiment, the communication device 4 is a local area network (LAN) board.

The controller 5 controls operation of each section of the electronic device 1. The controller 5 also receives signals from each section of the electronic device 1.

The controller 5 includes a processor such as a central processing unit (CPU).

In the present embodiment, the controller 5 receives the data indicating the first text from the input device 2. The controller 5 also receives a signal indicating the translation instruction and a signal indicating the translation target from the input device 2. In the following, the data indicating the first text that is the translation target will be referred to as "first text data".

The storage 6 stores data. The storage 6 includes a storage device and semiconductor memory. The storage device includes either or both of a hard disk drive (HDD) and a solid-state drive (SSD), for example. The semiconductor memory includes random-access memory (RAM) and read-only memory (ROM), for example.

The storage 6 stores a control program. The control program is executed by the controller 5. The controller 5 controls the operation of each section included in the electronic device 1 by executing the control program.

In the present embodiment, the storage 6 stores a secret character string table 61. The secret character string table 61 associates secret character strings with attributes thereof. The secret character strings are character strings which indicate information that is desired to be kept secret. The secret character strings are typically proper nouns. The secret character strings include a character string indicating personal information such as a name of a person and a character string indicating a company name, for example. The attributes indicate common nouns such as "person" and "company", for example. In the following, an attribute of a secret character string will be referred to as a "secret character string attribute".

Next, the secret character string table 61 according to the present embodiment will be described with reference to FIG. 3. FIG. 3 is a diagram illustrating an example of the secret character string table 61 according to the present embodiment.

As illustrated in FIG. 3, the secret character string table 61 associates secret character strings 611 with secret character string attributes 612. In the present embodiment, the secret character strings 611 are arbitrarily registered to the secret character string table 61 by the user. In the example illustrated in FIG. 3, a proper noun "実用新案株式会社 (Jitsuyoshinan Kabushiki-gaisha)", a proper noun "特許株 式会社 (Tokkyo Kabushiki-gaisha)", and a proper noun "特許 太郎 (Tokkyo Taro)" are registered as secret character strings 611. When registering a secret character string 611 to the secret character string table 61, the user registers a secret character string attribute 612 corresponding to the secret character string 611 to the secret character string table 61. In the example illustrated in FIG. 3, a common noun "会社 (kaisha)" is registered as the secret character string attribute 612 corresponding to "実川 新案株式会社 (Jitsuyoshinan Kabushiki-gaisha)" and "特許株式会社 (Tokkyo Kabushiki-gaisha)", and a common noun "人物 (jinbutsu)" is registered as the secret character string attribute 612 corresponding to "特許 太郎 (Tokkyo Taro)".

In the present embodiment, the controller 5 refers to the secret character string table 61 to execute a pre-transmission conversion process on the first text data upon receiving the signal indicating the translation instruction from the input device 2. The pre-transmission conversion process is a process through which a secret character string 611 included in the first text is converted into a mask character string. The mask character string is a character string for hiding the secret character string 611 in order to avoid leaking information indicated by the secret character string 611.

Figure 4:
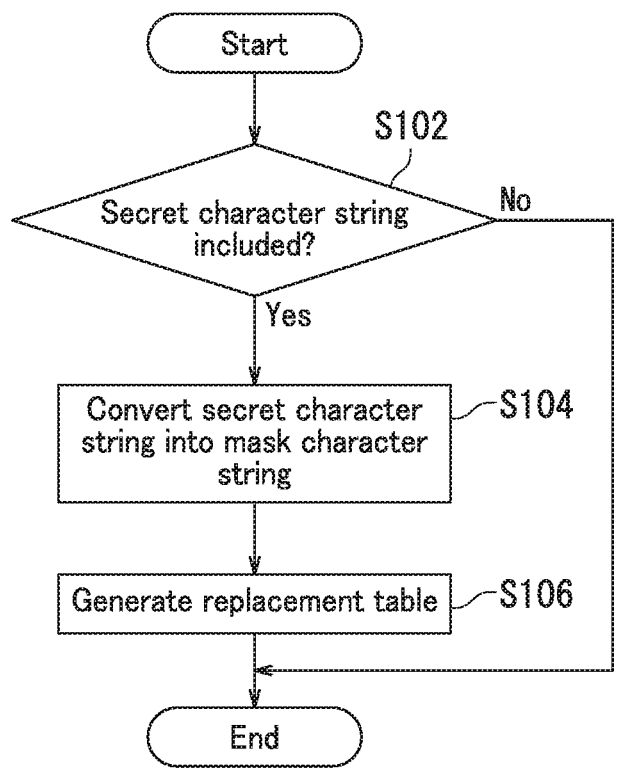
FIG. 4 is a flowchart illustrating a pre-transmission conversion process according to the embodiment of the present disclosure.

Continuing, the pre-transmission conversion process according to the present embodiment will be described in detail with reference to FIGS. 2 to 6. FIG. 4 is a flowchart illustrating the pre-transmission conversion process according to the present embodiment.

As illustrated by FIG. 4, the controller 5 determines whether or not a secret character string 611 described with reference to FIG. 3 is included in the first text (Step S102). In detail, the controller 5 searches the first text for a secret character string 611. Upon determining that no secret character string 611 is included in the first text (Step S102: No), the controller 5 ends the pre-transmission conversion process. Upon determining that a secret character string 611 is included in the first text by contrast (Step S102: Yes), the controller 5 converts the secret character string 611 into a mask character string (Step S104). Next, the controller 5 generates a replacement table 62 (Step S106), and ends the pre-transmission conversion process. The replacement table 62 is temporarily stored in the storage 6 described with reference to FIG. 2. Upon ending the pre-transmission conversion process, the controller 5 transmits the first text data in which the secret character string 611 has been converted into the mask character string to the translation server S.

Figure 5A:
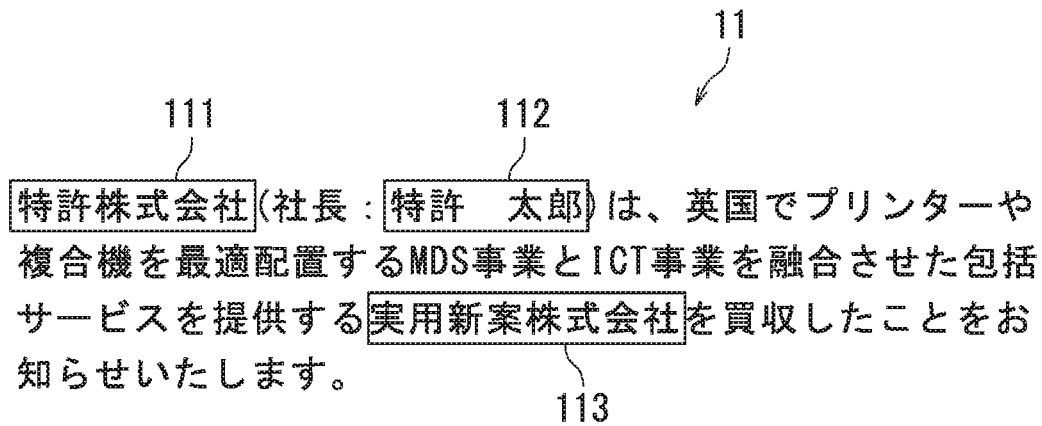
FIG. 5A is a diagram illustrating an example of first text before the pre-transmission conversion process is executed according to the embodiment of the present disclosure.
Figure 5B:
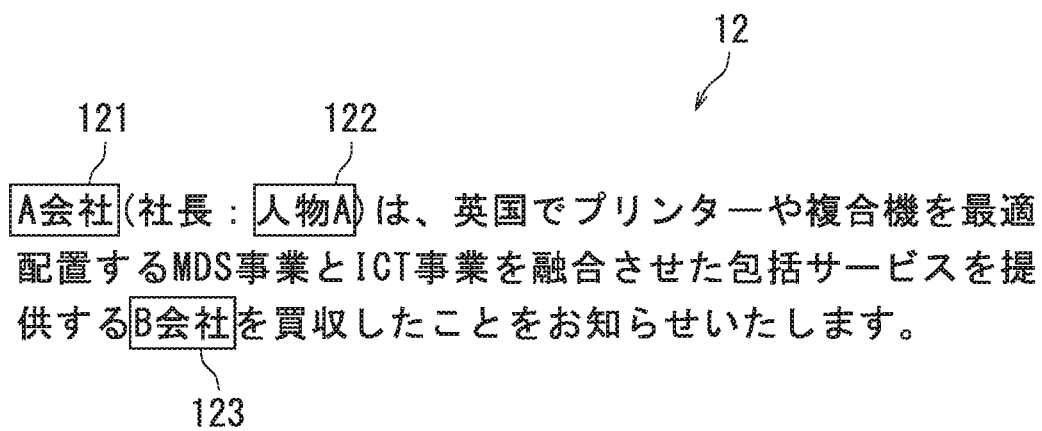
FIG. 5B is a diagram illustrating an example of first text after the pre-transmission conversion process has been executed according to the embodiment of the present disclosure.

FIG. 5A is a diagram illustrating an example of first text 11 before the pre-transmission conversion process is executed according to the present embodiment. In other words, FIG. 5A illustrates an example of first text 11 inputted with the input device 2. FIG. 5B is a diagram illustrating an example of first text 12 after the pre-transmission conversion process has been executed according to the present embodiment.

As illustrated in FIG. 5A, the first text 11 includes a character string "特許株 式会社 (Tokkyo Kabushiki-gaisha)" 111, a character string "特許 太郎 (Tokkyo Taro)" 112, and a character string "実用新案株式会社 (Jitsuyoshinan Kabushiki-gaisha)" 113. Note that in FIG. 5A, the character strings 111 to 113 are each enclosed by a rectangular frame for ease of understanding. The character string "特許株式会社 (Tokkyo Kabushiki-gaisha)" 111, the character string "特許 太郎 (Tokkyo Taro)" 112, and the character string "実用新案株式会社 (Jitsuyoshinan Kabushiki-gaisha)" 113 match the secret character strings 611 registered in the secret character string table 61 described with reference to FIGS. 2 and 3. Accordingly, the controller 5 determines that secret character strings 611 are included in the first text 11 illustrated in FIG. 5A (Step S102 in FIG. 4: Yes), and converts the character string "特許株式会社 (Tokkyo Kabushiki-gaisha)" 111, the character string "特許 太郎 (Tokkyo Taro)" 112, and the character string "実用新案株式会社 (Jitsuyoshinan Kabushiki-gaisha)" 113 (secret character strings 611) into mask character strings (Step S104 in FIG. 4).

The controller 5 determines mask character strings based on the secret character string attributes 612 respectively associated with the secret character strings 611 included in the first text 11. In detail, the controller 5 acquires the secret character string attributes 612 respectively associated with the secret character strings 611 included in the first text 11 from the secret character string table 61 (refer to FIG. 3). The controller 5 determines character strings each including a secret character string attribute 612 (common noun) and an identifier attached to the secret character string attribute 612 to be the mask character strings.

In the present embodiment, each identifier is a letter. A different identifier is attached to each secret character string attribute 612 successively in alphabetical order, starting with "A".

In the example illustrated in FIGS. 5A and 5B, the controller 5 respectively converts the character string "特許株式会社 (Tokkyo Kabushiki-gaisha)" 111, the character string "特許 太郎 (Tokkyo Taro)" 112, and the character string "実用新案 株式会社 (Jitsuyoshinan Kabushiki-gaisha)" 113 into a mask character string "A 会社 (A kaisha)" 121, a mask character string "人物 A (jinbutsu A)" 122, and a mask character string "B 会社 (B kaisha)" 123. Note that in FIG. 5B, the mask character strings 121 to 123 are each enclosed by a rectangular frame for ease of understanding.

In detail, the secret character string attribute 612 associated with the secret character string 611 "特許株式会社 (Tokkyo Kabushiki-gaisha)" is "会社 (kaisha)". Accordingly, the controller 5 determines the character string "A 会社 (A kaisha)" made from an identifier "A" and the secret character string attribute 612 "会社 (kaisha)" to be the mask character string for the character string "特許株式会社 (Tokkyo Kabushiki-gaisha)" 111. As a result, "特許株式会社 (Tokkyo Kabushiki-gaisha)" 111 is converted into "A 会社 (A kaisha)" 121 as illustrated in FIGS. 5A and 5B.

The secret character string attribute 612 associated with the secret character string 611 "特許 太郎 (Tokkyo Taro)" is "A 人物 (jinbutsu)". Accordingly, the controller 5 determines the character string "人物 A (jinbutsu A)" made from the identifier "A" and the secret character string attribute 612 "人物 (jinbutsu)" to be the mask character string for the character string "特許 太郎 (Tokkyo Taro)" 121. As a result, "特許 太郎 (Tokkyo Taro)" 112 is converted into "人物 (jinbutsu A)" 122 as illustrated in FIGS. 5A and 5B.

The secret character string attribute 612 associated with the secret character string 611 "実用新案株式会社 (Jitsuyoshinan Kabushiki-gaisha)" is "会社 (kaisha)". In the example illustrated in FIGS. 5A and 5B, the first text 11 includes two secret character strings 611 corresponding to the secret character string attribute 612 "会社 (kaisha)". The identifier "A" is used as an identifier for the mask character string of the character string "特許株式会社 (Tokkyo Kabushiki-gaisha)" 111. Accordingly, the controller 5 determines a character string "B 会社 (B kaisha)" made from an identifier "B" and the secret character string attribute "会社 (kaisha)" to be the mask character string for the character string "実用新案株式会社 (Jitsuyoshinan Kabushiki-gaisha)" 113. As a result, "実用新案株式会社 (Jitsuyoshinan Kabushiki-gaisha)" 113 is converted into "B 会社 (B kaisha)" 113 as illustrated in FIGS. 5A and 5B.

Next, the replacement table 62 according to the present embodiment will be described with reference to FIG. 6. FIG. 6 is a diagram illustrating an example of the replacement table 62 according to the present embodiment. The replacement table 62 is generated by the controller 5 in the pre-transmission conversion process as described in FIG. 4 (Step S106).

As illustrated in FIG. 6, the replacement table 62 associates first language mask character strings 621, second language mask character strings 622, and second language secret character strings 623 with each other.

The first language mask character strings 621 correspond to the secret character strings 611 converted into the first language mask character strings 621 through the pre-transmission conversion process.

The second language mask character strings 622 are character strings in which the first language mask character strings 621 have been translated into the second language. In the present embodiment, the controller 5 refers to a mask character string conversion table 63 prestored in the storage 6 to register the second language mask character strings 622 respectively corresponding to the first language mask character strings 621 to the replacement table 62. The mask character string conversion table 63 associates first language character strings that may be employed as secret character string attributes 612 with second language character strings respectively corresponding to the first language character strings.

The second language secret character strings 623 respectively correspond to the secret character strings 611 converted into the first language mask character strings 621 through the pre-transmission conversion process. The controller 5, for example, registers a character string in which an entirety or a part of a secret character string 611 is written in roman letters to the replacement table 62 as a second language secret character string 623 when the secret character string 611 is a first language character string.

In the example illustrated in FIG. 6, "A 会社 (A kaisha)", "人物 A (jinbutsu A)", and "B 会社 (B kaisha)" are registered as the first language mask character strings 621, "Company A", "Person A", and "Company B" are registered as the second language mask character strings 622, and "Tokkyo Co., Ltd.", "Tokkyo Taro", and "Jitsuyoshinan Co., Ltd." are registered as the second language secret character strings 623. Note that when the secret character strings 611 are second language character strings, the controller 5 registers the secret character strings 611 to the replacement table 62 as second language secret character strings 623.

Upon generating the replacement table 62, the controller 5 transmits the first text data in which the secret character strings 611 (the character strings 111, 112, and 113 in the example illustrated in FIG. 5A) have been converted into the first language mask character strings 621 (the character strings 121, 122, and 123 in the example illustrated in FIG. 5B) to the translation server S. Note that when determining that no secret character string is included in the first text data, the controller 5 transmits the first text data indicated by the input device 2 to the translation server S.

Upon receiving the first text data, the translation server S translates the first text (first language text) into the second text (second language text). Upon finishing the translation, the translation server S transmits data indicating the second text (second text data) to the controller 5. Note that communication between the controller 5 and the translation server S is executed through the communication device 4.

Upon receiving the second text data, the controller 5 executes the post-reception conversion process.

Figure 7:
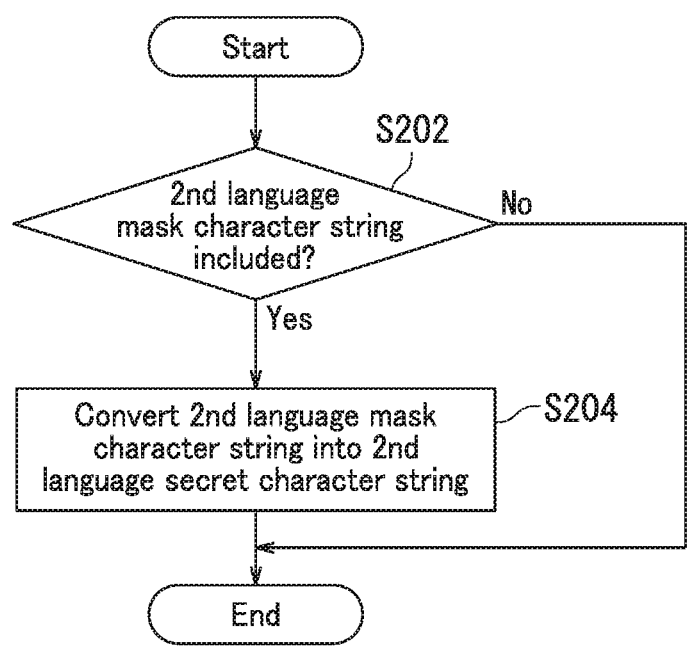
FIG. 7 is a flowchart illustrating a post-reception conversion process according to the embodiment of the present disclosure.

Continuing, the post-reception conversion process according to the present embodiment will be described with reference to FIGS. 2, 6, 7, and 8. FIG. 7 is a flowchart illustrating the post-reception conversion process according to the present embodiment.

As illustrated in FIG. 7, the controller 5 refers to the replacement table 62 (refer to FIG. 6) to determine whether or not a second language mask character string 622 is included in the second text (Step S202). In detail, the controller 5 searches the second text for a second language mask character string 622. Upon determining that no second language mask character string 622 is included in the second text (Step S202: No), the controller 5 ends the post-reception conversion process. Upon determining that a second language mask character string 622 is included in the second text by contrast (Step S202: Yes), the controller 5 refers to the replacement table 62 to convert the second language mask character string 622 into a second language secret character string 623 (Step S204). Upon converting the second language mask character string 622 into the second language secret character string 623, the controller 5 ends the post-reception conversion process. Upon ending the post-reception conversion process, the controller 5 causes the output device 3 (refer to FIG. 2) to output the second text. In detail, when a second language mask character string 622 is included in the second text, the controller 5 causes the output device 3 to output the second text in which the second language mask character string has been converted into a second language secret character string 623. Upon determining that no second language mask character string 622 is included in the second text by contrast, the controller 5 causes the output device 3 to output the second text received from the translation server S.

FIG. 8A is a diagram illustrating an example of second text 21 before the post-reception conversion process is executed according to the present embodiment. In other words, FIG. 8A illustrates an example of the second text 21 received from the translation server S. FIG. 8B is a diagram illustrating an example of second text 22 after the post-transmission conversion process has been executed according to the present embodiment.

As illustrated in FIG. 8A, the second text 21 includes a character string "Company A" 211, a character string "Person A" 212, and a character string "Company B" 213. Note that in FIG. 8A, the character strings 211 to 213 are each enclosed by a rectangular frame for ease of understanding. The character string "Company A" 211, the character string "Person A" 212, and the character string "Company B" 213 match the second language mask character strings 622 registered in the replacement table 62 described with reference to FIG. 6.

Accordingly, the controller 5 determines that second language mask character strings 622 are included in the second text 21 illustrated in FIG. 8A (Step S202 in FIG. 7: Yes), and converts the second language mask character strings 622 into second language secret character strings 623 (Step S204 in FIG. 7).

In the example illustrated in FIGS. 8A and 8B, the controller 5 respectively converts the character string "Company A" 211, the character string "Person A" 212, and the character string "Company B" 213 into a character string "Tokkyo Co., Ltd." 221, a character string "Tokkyo Taro" 222, and a character string "Jitsuyoshinan Co., Ltd." 223.

Note that in FIG. 8B, the character strings 221 to 223 are each enclosed by a rectangular frame for ease of understanding.

The present embodiment has been described above. According to the present embodiment, secret information can be prevented from leaking out even when an external translation server S is used.

Note that in the present embodiment, the controller 5 attaches an identifier to a character string indicated by a secret character string attribute 612 to generate a mask character string. However, the controller 5 may alternatively use only the character string indicated by the secret character string attribute 612 to generate the mask character string.

Also in the present embodiment, a configuration has been described in which the identifier is a letter. However, the identifier may be anything able to identify a secret character string and is not limited to a letter. The identifier may be a numeral, for example.

Also in the present embodiment, an example has been described in which the input device 2 is a keyboard. However, the input device 2 may alternatively be a touch sensor, for example.

Also in the present embodiment, a configuration has been described in which the output device 3 is a liquid-crystal display. However, the output device 3 may alternatively be an organic electroluminescent (EL) display, for example.

Also in the present embodiment, an example has been described in which the secret character strings 611 are a name of a person and company names. However, the secret character strings 611 may be any information that is desired to be kept secret, and may be addresses, for example.

Also in the present embodiment, a configuration has been described in which the secret character strings 611 are arbitrarily registered to the secret character string table 61 by the user. However, the secret character strings 611 may be preregistered to the secret character string table 61. Thus, a burden of registering the secret character strings can be omitted.

Also in the present embodiment, a configuration has been described in which the secret character strings 611 are registered to one table. However, the secret character strings 611 may also be registered to two or more tables. In this case, some secret character strings are arbitrarily registered to one table by the user, and other secret character strings are preregistered to another table. Thus, convenience for the user can be increased. Note that information indicating names of public figures and information indicating enterprise names may be registered in the other table, for example.

The embodiment of the present disclosure has been described above with reference to the drawings (FIGS. 1 to 8). However, the present disclosure is not limited to the above embodiment and can be practiced in various ways within the scope not departing from the gist of the present disclosure. Furthermore, the configuration illustrated in the above embodiment is one example and not particularly limited. Various alterations are possible within a scope not substantially departing from the effects of the present disclosure.

For example, in the embodiment of the present disclosure, an example has been described in which the electronic device 1 is a personal computer. However, the present disclosure is not limited hereto. The present disclosure is applicable to an image forming apparatus such as a multi-function peripheral, for example.

Also in the embodiment of the present disclosure, an example of a configuration has been described in which the controller 5 acquires first text data inputted with a keyboard or a touch sensor. However, the present disclosure is not limited hereto. The first text data may be generated by an optical character recognition (OCR) device, for example. Specifically, the controller 5 may acquire text data using an OCR function from image data generated by an input device such as a scanner.

What is claimed is:

1. An electronic device comprising:
   a controller configured to acquire data indicating first text in a first language, the first text including a plurality of character strings each with a character string attribute;
   storage configured to store a secret character string table and a mask character string conversion table, the secret character string table associating secret character strings among the character strings each indicating secret information with secret character string attributes of the secret character strings, the mask character string conversion table associating a character string in the first language among the character strings with a character string in a second language different from the first language, the character string in the first language being employed as a corresponding one of the secret character string attributes, the character string in the second language corresponding to the character string in the first language; and
   a communication device configured to perform communication with a translation server which translates the first text into second text in the second language, wherein
   the controller determines whether or not one secret character string of the secret character strings is included in the first text,
   upon determining that the one secret character string is included in the first text, the controller acquires a secret character string attribute associated with the one secret character string included in the first text from the secret character string table,
   the controller attaches an identifier to each of the secret character string attributes in an alphabetic order,
   the controller determines the character strings with the secret character string attributes to which the identifiers are attached to each be a mask character string, the mask character string being for hiding the one secret character string,
   the controller converts the one secret character string into a mask character string in the first language,
   in converting the one secret character string into the mask character string in the first language, the controller generates a replacement table based on the mask character string conversion table, the replacement table associating the mask character string in the first language, a secret character string in the second language, and a mask character string in the second language corresponding to the mask character string in the first language with each other, the secret character string in the second language corresponding to the one secret character string in the first language,
   the controller stores the replacement table in the storage,
   the controller transmits data indicating the first text in which the one secret character string has been converted into the mask character string in the first language to the translation server through the communication device,
   when the communication device receives data indicating the second text, the controller refers to the replacement table stored in the storage to search the second text for the mask character string translated into the second language, and
   the controller converts the mask character string in the second language into the one secret character string in the second language.

2. The electronic device according to claim 1, wherein the first language is Japanese and the second language is English.

3. The electronic device according to claim 1, wherein the secret character string in the second language is a character string in which an entirety or a part of the secret character string in the first language is written in roman letters.

4. The electronic device according to claim 1, further comprising
   an optical character recognition device configured to generate the data indicating the first text in the first language, wherein
   the controller acquires the data indicating the first text in the first language generated by the optical character recognition device from the optical character recognition device.

5. A translation support method, comprising:
   acquiring data indicating first text in a first language, the first text including a plurality of character strings each with a character string attribute;
   storing a secret character string table and a mask character string conversion table, the secret character string table associating secret character strings among the character strings each indicating secret information with secret character string attributes of the secret character strings, the mask character string conversion table associating a character string in the first language among the character strings with a character string in a second language different from the first language, the character string in the first language being employed as a corresponding one of the secret character string attributes, the character string in the second language corresponding to the character string in the first language;
   performing communication with a translation server which translates the first text into second text in the second language;
   determining whether or not one secret character string of the secret character strings is included in the first text;
   acquiring, upon determining that the one secret character string is included in the first text, a secret character string attribute associated with the one secret character string included in the first text from the secret character string table;
   attaching an identifier to each of the secret character string attributes in an alphabetic order;
   determining the character strings with the secret character string attributes to which the identifiers are attached to each be a mask character string, the mask character string being for hiding the one secret character string;
   converting the one secret character string in the first language into a mask character string for hiding the secret character string;
   generating, in converting the one secret character string into the mask character string in the first language, a replacement table based on the mask character string conversion table, the replacement table associating the mask character string in the first language, a secret character string in the second language, and a mask character string in the second language corresponding to the mask character string in the first language with each other, the secret character string in the second language corresponding to the one secret character string in the first language;

storing the replacement table;

transmitting data indicating the first text in which the secret character string has been converted into the mask character string in the first language to a translation server;

receiving data indicating second text in which the first text has been translated into a second language from the translation server;

referring to the stored replenishment table to search the second text for the mask character string translated into the second language; and converting the mask character string in the second language into the secret character string in the second language.

* * * * *